Aug. 13, 1968  R. E. LEHMAN  3,396,519
HEIGHT ADJUSTMENT MECHANISM FOR POWER MOWER VEHICLES
Filed Oct. 23, 1965  4 Sheets-Sheet 1
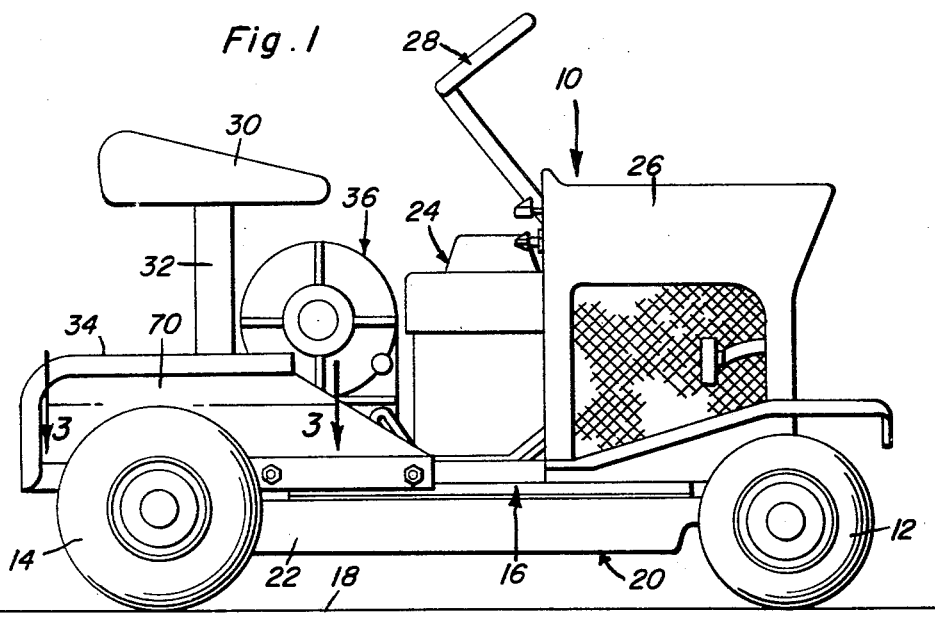
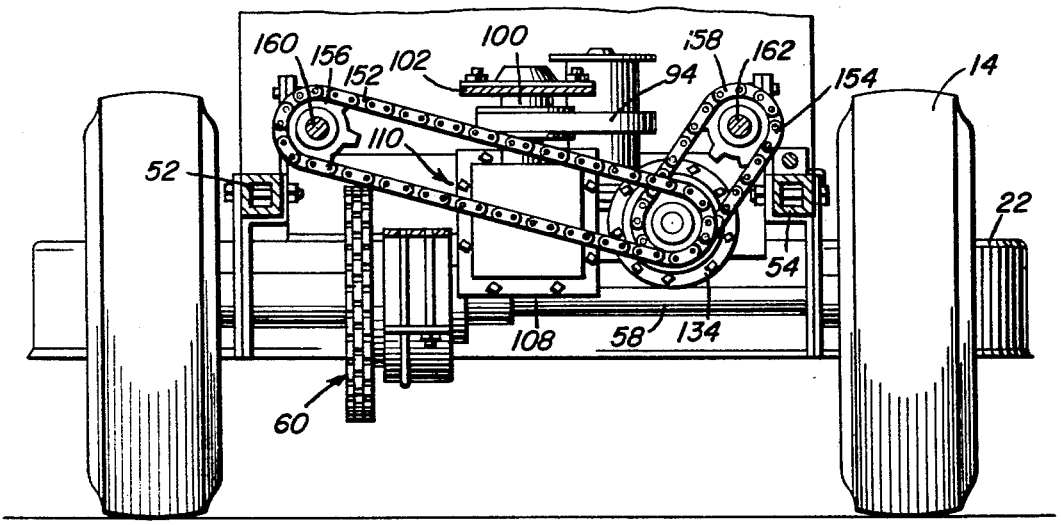
Robert E. Lehman
INVENTOR.
BY *Clarence A. O'Brien*
*and Harvey B. Jacobson*
Attorneys Aug. 13, 1968　　　R. E. LEHMAN　　　3,396,519
HEIGHT ADJUSTMENT MECHANISM FOR POWER MOWER VEHICLES
Filed Oct. 23, 1965　　　　　　　　　　　　　4 Sheets-Sheet 2

Robert E. Lehman
INVENTOR.

Robert E. Lehman
INVENTOR.

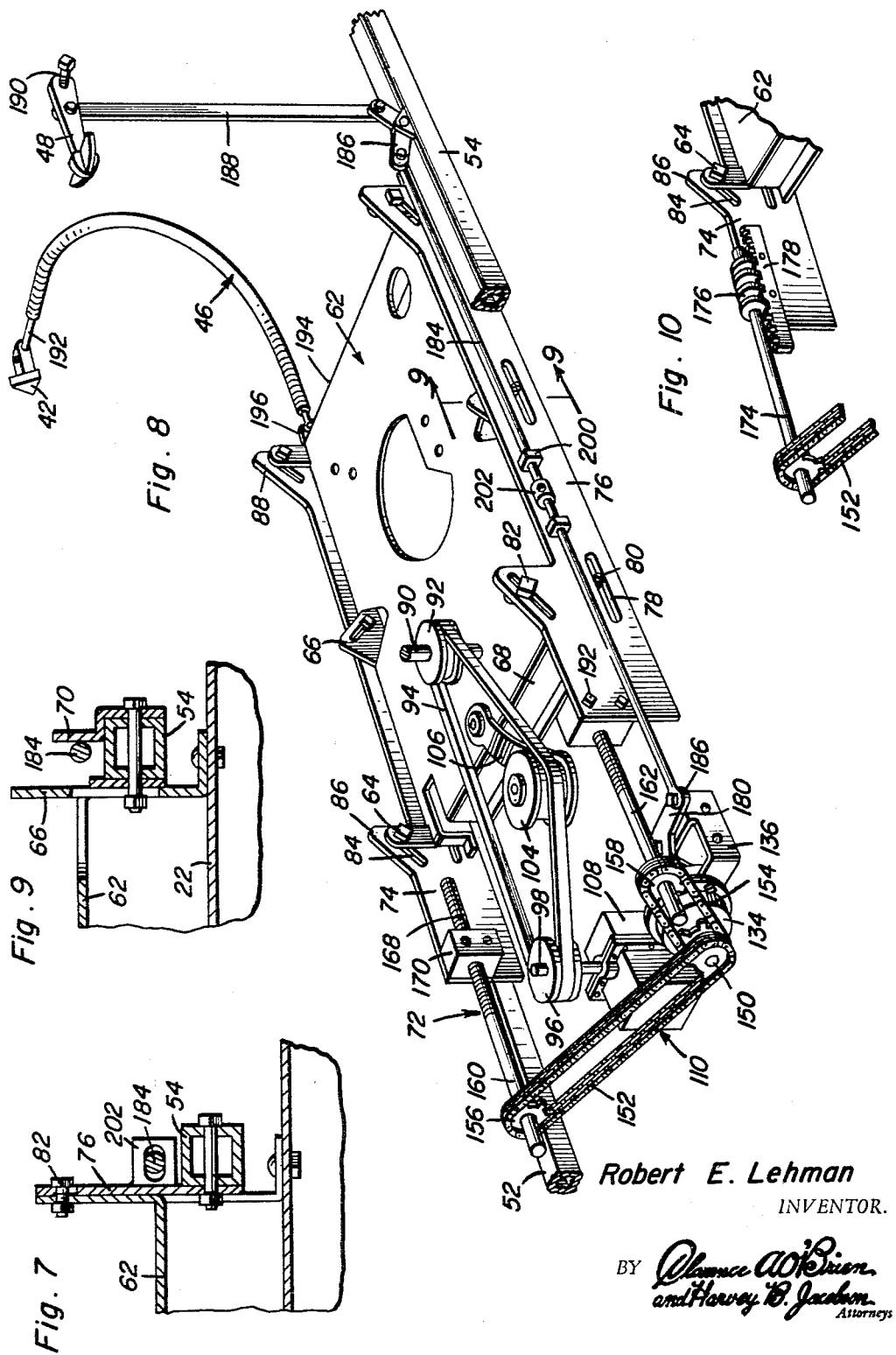

United States Patent Office 3,396,519
Patented Aug. 13, 1968

3,396,519
HEIGHT ADJUSTMENT MECHANISM FOR
POWER MOWER VEHICLES
Robert E. Lehman, % Aircapital Manufacturers,
Inc., P.O. Box 1070, Tupelo, Miss. 38801
Filed Oct. 23, 1965, Ser. No. 502,928
13 Claims. (Cl. 56—25.4)

This invention relates to power mowers of the self-propelled type and more particularly to a height adjusting mechanism for the power operated cutter assembly associated with such power mowers.

It is therefore a primary object of the present invention to provide an adjusting mechanism for the cutter assembly associated with self-propelled mower vehicles whereby the cutting height of the cutter blade may be easily and rapidly adjusted by the vehicle operator from the vehicle operating station.

An additional object of the present invention is to provide a height adjusting mechanism for the cutter assembly of a power mower vehicle which is power operated under the selective control of the vehicle operator.

A further object of the present invention is to provide a power operated height adjustment mechanism for the cutter assembly of a self-propelled power mower whereby the cutting height of the cutter assembly may be adjusted in either direction by a manual control mounted adjacent to a control panel which mounts a position indicator so that adjustment of the cutter assembly may be effected to any desired height.

In accordance with the foregoing objects, height adjustment of the cutter assembly associated with a power operated mower, will not require the use of any tools nor any time-consuming adjustment procedure as heretofore required. Further, the power operated height adjustment mechanism may be installed on existing power operated mower vehicles without requiring any substantial modification or structural changes therein.

A still further object of the present invention in accordance with the foregoing objects, is to provide a limit safety device for preventing over-adjustment of the cutter assembly by the power operating facilities.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a typical self-propelled, power mower vehicle provided with the height adjustment mechanism of the present invention.

FIGURE 5 is a sectional view taken substantially through a plane indicated by section line 5—5 in FIGURE 3.

FIGURE 7 is a partial sectional view taken substantially through a plane indicated by section line 7—7 in FIGURE 6.

FIGURE 8 is a perspective view of the height adjustment facilities associated with the present invention shown separated from its installational environment.

FIGURE 9 is an enlarged partial sectional view taken substantially through a plane indicated by section line 9—9 in FIGURE 8.

FIGURE 10 is a perspective view showing a modification of the height adjustment mechanism shown in FIGURE 8.

Figure 2:
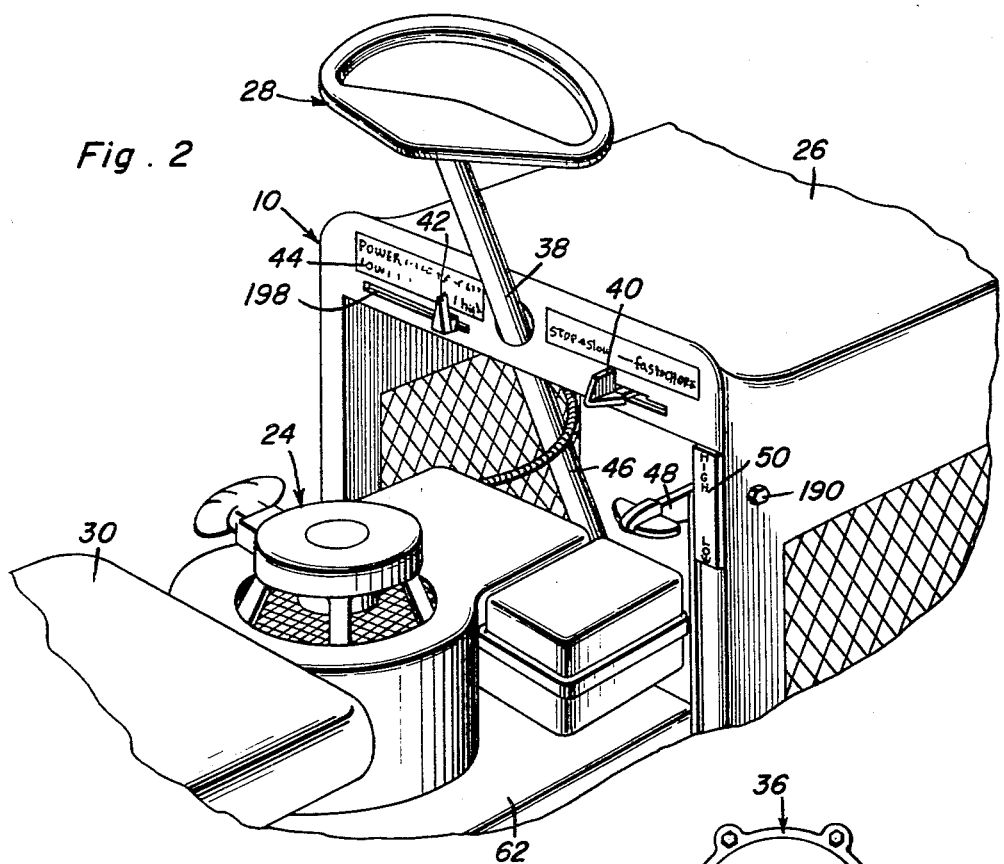
FIGURE 2 is a partial perspective view of the power mower vehicle illustrated in FIGURE 1, showing the operator's station thereon.

Referring now to the drawings in detail, it will be observed from FIGURE 1 that the present invention is concerned with a power operated mower vehicle generally denoted by reference numeral 10 which is self-powered and has a pair of forward dirigible wheels 12 and a pair of rear propelling wheels 14. The wheels support the vehicle frame assembly 16 a predetermined distance above the ground 18 so that grass and vegetation may be cut by a cutter assembly generally denoted by reference numeral 20 which is mounted below the vehicle frame between the wheels 12 and 14. The cutter assembly includes therefore, a cutter base 22 enclosing a rotary cutter blade (not shown) disposed below the vehicle frame. Mounted on top of the frame between the front and rear wheels, is an internal combustion engine 24 constituting the source of power for operating the cutter assembly and for propelling the vehicle. The vehicle controls are enclosed within a front hood 26 from which the steering control assembly 28 projects upwardly and rearwardly in proper position for manipulation by the vehicle operator when seated on the seat 30. The seat is supported by a standard 32 extending upwardly from a rear cowling 34 disposed between the rear wheels 14 and enclosing the power operated height adjustment mechanism of the present invention. Power for operating the height adjustment mechanism is taken from a transmission 36 mounted rearwardly of the engine 24 on the frame, the transmission also being operative to transmit power to the rear propelling wheels 14.

As shown in FIGURE 2, the steering control 28 projects through an opening in a control panel 38 having facilities for mounting the engine control 40. Also mounted by the control panel, is a position indicator 42 having a scale 44 associated therewith so that the vehicle operator may observe the height at which the cutter assembly is positioned. The indicator 42 is therefore connected to the height adjustment mechanism by means of a Bowden wire cable 46 as will be hereafter explained. Also projecting rearwardly from the hood 26, is a manually operable control lever 48 adapted to be displaced either upwardly or downwardly from a neutral position in order to either raise or lower the cutter blade assembly as indicated by the indicia on the plate 50 mounted alongside of the control lever. It will therefore be apparent, that the vehicle operator may at any time change the vertical position of the cutter blade assembly in order to change the cutting height by displacing the control lever 48 either upwardly or downwardly and observing the movement of the position indicator 42. When the position indicator has reached a desired cutting height, the control lever 48 may be restored to a neutral position in order to terminate power operated movement of the height adjusting mechanism.

Figure 6:
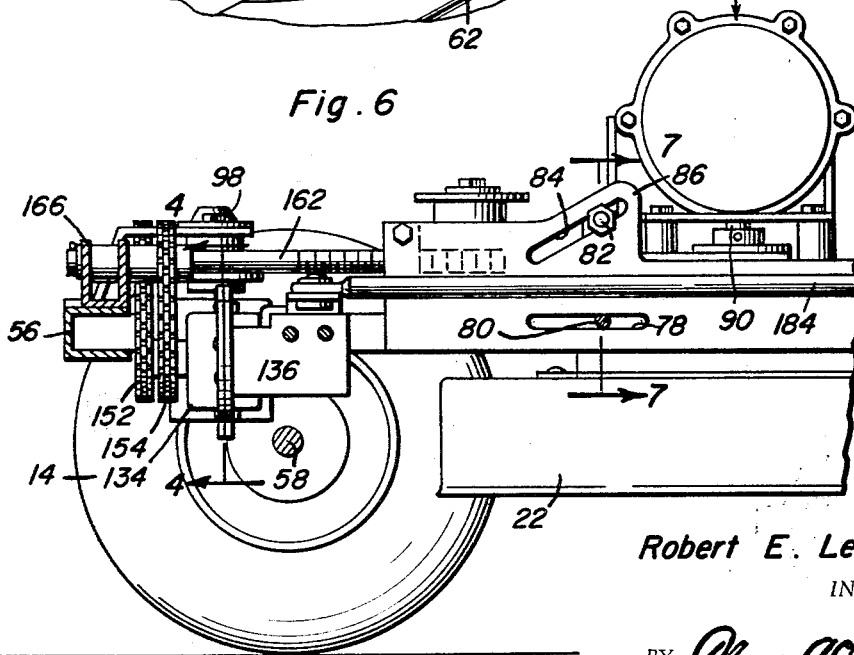
FIGURE 6 is a partial sectional view taken substantially through a plane indicated by section line 6—6 in FIGURE 3.
Figure 3:
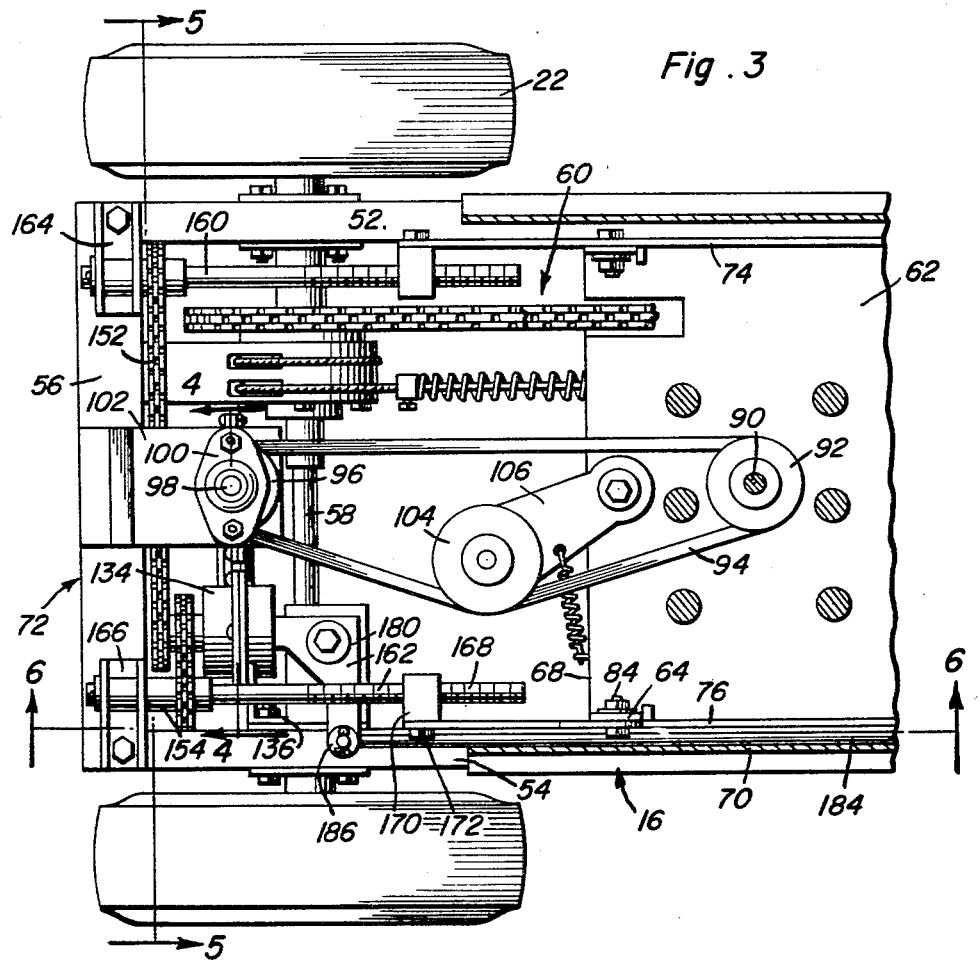
FIGURE 3 is an enlarged partial sectional view taken substantially through a plane indicated by section line 3—3 in FIGURE 1.

Referring now to FIGURES 3, 5 and 6, it will be observed that the vehicle frame assembly 16 includes a pair of longitudinal frame members 52 and 54 interconnected at the rear end of the vehicle by a cross frame member 56. The propelling traction wheels 22 are rotatably mounted on the frame members about a fixed axis by means of the drive axle 58. The drive axle is driven by a sprocket chain drive 60 which extends from the engine driven transmission 36. The engine, transmission and cutter assembly are mounted on a mounting base 62 with the cutter assembly depending from the mounting base while the engine and transmission are supported thereabove. The mounting base is formed from a generally flat, horizontal plate having downwardly depending sides and vertically upstanding lugs 64 adjacent the four corners of its rectangular shape as well as a pair of triangular upstanding portions 66 intermediate the lugs 64 at opposite ends as shown in FIGURE 8. The mounting base 62 extends longitudinally between the front and rear wheels and the rear end 68 thereof terminates between the side panels 70 to which the rear cowling 34 is connected and between which the height adjusting mechanism 72 is mounted.

The mounting base 62 is supported for vertical adjustment between the frame members 52 and 54 by a pair of slide bars 74 and 76. The slide bars therefore extend longitudinally between the frame members and the sides of the mounting base and are slidably mounted on the frame members. Toward this end, the slide bars are provided with a plurality of longitudinal slots 78 through which mounting bolts 80 extend, the mounting bolts being secured to the frame members as more clearly seen in FIGURE 7. Thus, the slide bars may be slidably displaced in a horizontal direction relative to the frame assembly. The corner lugs 64 of the mounting base also support fastener bolts 82 which extend through diagonal cam slots 84 formed in longitudinally spaced cam portions 86 and 88 which project upwardly from the slide bars 74 and 76. Slidable displacement of the slide bars 74 and 76 will therefore impart vertical movement to the mounting base 62 so as to change the cutting height of the cutter assembly depending therefrom.

The mounting of the engine, transmission and cutter assembly on the mounting base as well as the driving connection between the transmission and the propelling wheels of the vehicle do not form any part of the present invention. However, the mechanism for imparting horizontal displacement to the slide bars 74 and 76 in order to effect vertical adjusting movement of the mounting base represents an important and significant contribution of the present invention. Thus, the height adjusting mechanism 72 is operatively connected to the slide bars 74 and 76 and receives power from a power take-off shaft 90 that extends downwardly from the power transmission 36 above the mounting base 62. A drive pulley 92 is therefore connected to the power take-off shaft 90 and has entrained thereabout, an endless, friction drive belt 94. As more clearly seen in FIGURES 3 and 8, the power take-off drive belt 94 drivingly connects the drive pulley 92 with a driven pulley wheel 96 secured to a shaft 98 rotatably mounted about a vertical axis established by the journal bearing assembly 100 which in turn is fixedly mounted in proper position by the bracket 102 on the rear cross frame member 56 of the frame assembly. The drive belt is yieldably held in driving engagement with the drive pulley 92 and driven pulley 96 by means of an idler pulley 104 rotatably mounted on an idler arm 106. The idler arm is pivotally mounted on the mounting base adjacent the rear end 68 and is spring-biased into engagement with the drive belt 94 in order to maintain it under proper driving tension for continuously transmitting rotation to the driven pulley wheel 96 when the engine 24 is operating.

Figure 4:
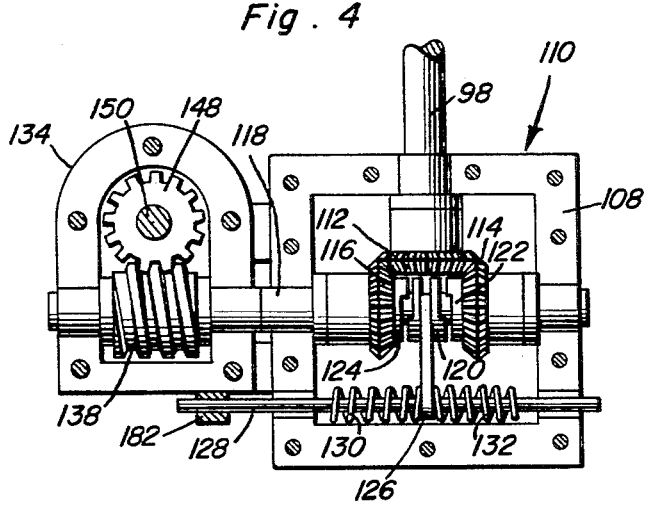
FIGURE 4 is an enlarged partial sectional view taken substantially through a plane indicated by section line 4—4 in FIGURE 3.

The pulley shaft 98 to which the driven pulley wheel 96 is connected, extends downwardly into the housing 108 of a reversing gear unit 110. As shown in FIGURE 4, the pulley shaft 98 is connected to a drive bevel gear 112 within the gear housing which rotatably mounts a pair of bevel gears 114 and 116 in constant mesh with the drive bevel gear 112. It will therefore be apparent, that the bevel gears 114 and 116 will be driven in opposite directions. Each of the bevel gears 114 and 116 is rotatably mounted on an output shaft 118 of the reversing gear unit so that the output shaft 118 will be driven in a forward or reverse direction dependent upon which of the bevel gears 114 and 116 is coupled thereto. A coupling collar 120 is therefore slidably splined to the output shaft 118 between the bevel gears 114 and 116 and is adapted to be axially displaced into engagement with one or the other of the coupling elements 122 and 124 respectively associated with the bevel gears 114 and 116. The coupling collar 120 is shifted between its opposite axial positions engaging the coupling elements 122 and 124 by means of a shifting fork 126 connected to an actuating rod 128 slidably mounted by the gear box housing 108. A pair of centering springs 130 and 132 are mounted on the actuating rod 128 in engagement with the shifting fork 126 so as to yieldably displace the coupling collar 120 from a neutral position. The output shaft 118 extends axially from one side of the gear box housing 108 into a reduction gear box 134 fixedly mounted in proper position on the frame member 54 by means of the mounting bracket 136 as more clearly shown in FIGURES 3 and 8. A worm gear 138 is connected to the shaft 118 as shown in FIGURE 4 and meshes with a worm wheel 140 to establish a high reduction, right angle drive connection between the shaft 118 and a sprocket drive shaft 150. The sprocket drive shaft 150 extends rearwardly from the reduction gear box 134 and is connected to a pair of drive sprocket wheels respectively engaged with endless sprocket chains 152 and 154.

The sprocket chains 152 and 154 respectively engage driven sprocket wheels 156 and 158 which are connected to power adjustment shafts 160 and 162. The power shafts are rotatably mounted about horizontal, parallel spaced axes by means of the journal brackets 164 and 166 secured to the cross frame member 56 as more clearly seen in FIGURE 3. In one form of height adjusting mechanism, the power shafts 160 and 162 are provided with externally threaded portions 168 that are threadedly received through internally threaded nut members 170 secured to the rear ends of the slide bar members 74 and 76 by means of fasteners 172. It will therefore be apparent, that when the reversing gear unit 110 is rendered operative in either direction, the sprocket chains 154 and 152 will impart rotation to the power shafts 160 and 162 at a relatively low speed and in the same rotational direction in order to effect linear, horizontal displacement of the slide bars 74 and 76 in one direction or the other. Such movement of the slide bars will impart vertical adjusting movement to the mounting base 62 because of the operative connection between the slide bars and the mounting base through the cam slots 84 and follower bolt assemblies 82. An alternative driving connection for imparting linear movement to the slide bars is illustrated in FIGURE 10 wherein the sprocket chains impart rotation to power shafts 174 to which worm gears 176 are connected. The worm gears mesh with rack members 178 secured to the end portions of the slide bars in order to impart linear movement thereto in response to rotation of the power shafts 174 in the same manner as described in connection with the power shafts 160 and 162.

In order to control operation of the reversing gear unit 110, a right angle control arm 180 is pivotally mounted on the bracket 136 so that one end portion 182 of the control arm will project below the reduction gear box 134 and be connected to the actuating rod 128 as shown in FIGURE 4. Pivotal displacement of the control arm 180 in opposite directions will thereby axially displace the actuating rod 128 in order to effect a forward or reverse drive through the reversing gear unit. The control arm 180 is pivotally displaced about its pivot by means of a control rod 184 which is pivotally connected to the end portion 186 of the control arm and extends longitudinally between the slide bar 76 and a side panel 70 just above the frame member 54. The forward end of the control rod is pivotally connected to a bell crank 186 mounted on the frame member 54 as shown in FIGURE 8, the bell crank forming part of a linkage including the connecting rod 188 which connects the control rod to the manually operated control lever 48. The control lever is therefore pivotally mounted by the pivot bolt 190 at a suitable location on the vehicle as shown in FIGURE 2. Upward or downward displacement of the control lever will therefore cause axial displacement of the actuating rod 128 from its neutral position as shown in FIGURE 4 in order to effect either forward or reverse drive through the reversing unit 110. Upward or downward adjusting movement is thereby imparted to the mounting base 62 in order to change the cutting height of the cutter assembly. As the mounting base is being vertically adjusted in response to linear movement of the slide bars 74 and 76, the slide wire 192 associated with the Bowden wire cable 46 will displace the position indicator 42 in view of the connection of the slide wire to the forward end 194 of the mounting base by means of the lug 196 for example. The conduit of the Bowden wire cable will therefore be suitably anchored to the control panel 38 shown in FIGURE 2 so that the output end of the slide wire 192 may displace the position indicator 42 along the slot 198. The vehicle operator may therefore manipulate the control lever 48 in order to change the cutting height until a desired height is shown by the position indicator 42.

In order to prevent over-adjustment of the mounting base in either direction, safety limit means is provided whereby adjusting movement will be stopped whenever certain adjustable limits are exceeded. This is accomplished by automatically disengaging the reversing unit 110. Toward this end, the slide bar 76 is provided with a pair of longitudinally spaced guide lugs 200 through which the control rod 184 extends as more clearly seen in FIGURES 7 and 8. Fixedly secured by a setscrew to the control rod between the guide lugs 200, is a limit collar 202 adapted to be engaged by one of the guide lugs 200 when the slide bar 76 is displaced to either one of its limit positions. Thus, when the control rod 184 is displaced in one direction in order to render the reversing gear unit 110 operative, the slide bar 76 will be displaced by the height adjusting mechanism 72 until the gear unit 110 is disengaged by restoring the control lever 48 to its neutral position. However, should the operator fail to do so and the slide bar 76 continues to move torward a limit position, one of the guide lugs 200 will engage the limit collar 202 and displace the control rod 184 in a direction returning it to the neutral position in order to disengage the reversing gear unit 110. The guide lugs 200 will thereby prevent any continued drive of the slide bars beyond certain limit positions corresponding to the maximum vertical adjusting positions of the cutter assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a power mower having a wheeled vehicle frame and an engine drivingly connected to a cutter assembly disposed below said frame, means for adjusting the position of the cutter assembly above the ground comprising, a mounting base supporting the engine and the cutter assembly connected thereto, slide means operatively connected to the frame and the mounting base for vertical adjustment thereof, power operating means operatively connected to the slide means for movement thereof in opposite directions between limit positions, power take-off means drivingly connecting the engine to the power operating means, and control means connected to the power take-off means for selectively controlling said movement of the slide means.

2. The combination of claim 1 including indicator means operatively connected to the slide means for indicating the position of the cutter assembly.

3. The combination of claim 2 wherein said power operating means comprises a pair of power shafts mounted by the frame, gear means connected to the slide means and the power shafts for horizontal displacement of the slide means in response to rotation of the power shafts, and means drivingly connecting the power shafts to the power take-off means for simultaneousl rotation in the same direction.

4. The combination of claim 3 wherein said power take-off means comprises, a disengageable reversing gear unit operatively connected to the control means, reduction drive means drivingly connecting the reversing gear unit to the power operating means, and yieldable drive means drivingly connecting the reversing gear unit to the engine for continuously transmitting power to the reversing gear unit when the engine is operating.

5. The combination of claim 4 wherein said control means comprises, linkage means connected to the reversing gear unit for conditioning thereof for forward and reverse drive, guide means mounted on the slide means through which said linkage means extends, manually operated means connected to said linkage means for displacement thereof to a position operatively conditioning the reversing gear unit, and limit means mounted on the linkage means and engageable with said guide means for returning the linkage means to a neutral position disengaging the reversing gear unit in response to movement of the slide means to one of said limit positions thereof.

6. The combination of claim 1 wherein said power operating means comprises a pair of power shafts mounted by the frame, gear means connected to the slide means and the power shafts for horizontal displacement of the slide means in response to rotation of the power shafts, and means drivingly connecting the power shafts to the power take-off means for simultaneous rotation in the same direction.

7. The combination of claim 1 wherein said power take-off means comprises, a disengageable reversing gear unit operatively connected to the control means, reduction drive means drivingly connecting the reversing gear unit to the power operating means, and yieldable drive means drivingly connecting the reversing gear unit to the engine for continuously transmitting power to the reversing gear unit when the engine is operating.

8. The combination of claim 7 wherein said control means comprises, linkage means connected to the reversing gear unit for conditioning thereof for forward and reverse drive, guide means mounted on the slide means through which said linkage means extends, manually operated means connected to said linkage means for displacement thereof to a position operatively conditioning the reversing gear unit, and limit means mounted on the linkage means and engageable with said guide means for returning the linkage means to a neutral position disengaging the reversing gear unit in response to movement of the slide means to one of said limit positions thereof.

9. The combination of claim 1 wherein said control means comprises, linkage means connected to the power take-off means for conditioning thereof for forward and reverse drive, guide means mounted on the slide means through which said linkage means extends, manually operated means connected to said linkage means for displacement thereof to a position operatively conditioning the power take-off means, and limit means mounted on the linkage means and engageable with said guide means for returning the linkage means to a neutral position disengaging the power take-off means in response to movement of the slide means to one of said limit positions thereof.

10. In combination with a power mower having a vehicle frame, a pair of propelling wheels rotatably mounted by the frame about a fixed axis, and a power operated cutter assembly operatively mounted by the frame for vertical adjustment, means for selectively adjusting the position of the cutter assembly on the frame comprising, cam means displaceably mounted by the frame for movement between limit positions to adjustably position the power operated cutter assembly, disengageable drive means drivingly connecting the power operated cutter assembly to the cam means for movement thereof, control means operatively connected to the drive means for selective operation thereof in a forward and a reverse drive condition, means responsive to movement of the cam means to one of the limit positions thereof for disengaging the drive means and means for continuously indicating the position of the cutter assembly.

11. In combination with a power mower having a vehicle frame, a pair of propelling wheels rotatably mounted by the frame about a fixed axis, and a power operated cutter assembly operatively mounted by the frame for vertical adjustment, means for selectively adjusting the position of the cutter assembly on the frame comprising, a pair of slide bars mounted by the frame and having camming slots therein, follower means connected to the power operated cutter assembly and extending through said camming slots, a pair of power shafts rotatably mounted by the frame between said propelling wheels, means drivingly connecting the power shafts to the slide bars for displacement thereof relative to the frame, a reversing gear device drivingly connected to the power shafts for simultaneous rotation thereof in the same direction, control means operatively connected to the reversing gear device for selectively rendering the same operative, said control means including a control rod extending alongside of one of the slide bars, manually operated linkage means connected to the control rod in spaced axial relation to the power shafts, and endless drive belt means drivingly connecting the power operated cutter assembly to the reversing gear device.

12. The combination of claim 11 including drive disengaging means connected to the control rod and said one of the slide bars for displacing the control rod to a position preventing operation of the reversing gear device in response to movement of the said slide bar to a limit position.

13. In combination with a power mower having a wheeled vehicle frame and an engine drivingly connected to a cutter assembly disposed below said frame, means for adjusting the position of the cutter assembly above the ground comprising, a mounting base supporting the engine and the cutter assembly connected thereto, cam means mounted by the mounting base and engageable with the frame for vertical adjustment of the mounting base, power operating means operatively connected to the cam means for imparting movement to the cam means and the mounting base between limit positions, power take-off means drivingly connecting the engine to the power operating means, and control means connected to the power take-off means for selectively controlling said movement of the mounting base.

References Cited

UNITED STATES PATENTS

| 3,063,226 | 11/1962 | Pfauser | 56—25.4 |
| 3,205,642 | 9/1965 | Smith | 56—25.4 |
| 3,208,207 | 9/1965 | Bottenberg | 56—25.4 |
| 3,303,524 | 2/1967 | Schneider | 56—25.4 X |
| 3,357,165 | 12/1967 | Thon | 56—25.4 |

ROBERT E. BAGWILL, *Primary Examiner.*